United States Patent Office

2,810,718
Patented Oct. 22, 1957

2,810,718

BASIC SALICYLAMIDES

Bruce W. Horrom and Leo R. Swett, Waukegan, Ill., assignors to Abbott Laboratories, North Chicago, Ill., a corporation of Illinois No Drawing. Application July 2, 1953,
Serial No. 365,768

9 Claims. (Cl. 260—247.2)

This invention relates to a class of new chemical compounds identified broadly as the basic salicylamides and the basic acetylsalicylamides. The invention further relates to a novel method for making such new chemical compounds.

The new chemical compounds of this invention show activity as local anesthetics and fungicides. In addition the basic salicylamide chemical structure is of considerable general interest in the pharmaceutical field and numerous attempts have been made in the past to synthesize new chemicals of this general type, without success.

It is now possible through the practice of this invention to prepare new chemicals which may be identified by the formula

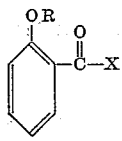

where R is from the group consisting of hydrogen and acetyl, X is from the group consisting of substituted piperazyl, substituted piperidyl and

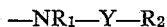
—NR₁—Y—R₂ where R₁ is from the group consisting of hydrogen and lower alkyl, Y is from the class consisting of alkylene groups having 2–10 carbon atoms and saturated cyclic hydrocarbon groups having 2–6 carbon atoms, and R₂ is from the group consisting of dialkylamino, piperidino and morpholino. The compounds of the foregoing formula are all bases and the invention contemplates the preparation of the acid addition salts of these bases by known methods.

The R₁ substituent in the foregoing formula may be either hydrogen or lower alkyl. In other words the compounds may have either the properties of a secondary or tertiary amine. The lower alkyl groups may include the methyl, ethyl, propyl, butyl groups and branched chain equivalents. The symbol Y is intended to include straight and branched chain alkylene groups as well as cyclic groups, such as the cyclohexyl derivative of Example X. The substituted piperazine and substituted piperidine groups which are designated by the symbol X in the foregoing formula are those piperazines and piperidines which are substituted by an alkyl group or a substituted alkyl group. For example the substitution may be of a methyl, ethyl, propyl, or butyl group in one or more of the positions on the ring compound. As substituted alkyl groups may be mentioned, the piperidinoethyl group, the morpholinoethyl group, the dialkylaminoethyl group, the carbethoxy group and equivalent chemical structures.

The compounds of this invention are made by reacting equimolar proportions of an acetylsalicylyl halide and a diamine from the group consisting of substituted piperazyl, substituted piperidyl and

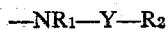
—NR₁—Y—R₂ where R₁ is hydrogen or lower alkyl, Y is an alkylene chain of 2 to 10 carbons or a saturated cyclic hydrocarbon group of 2 to 6 carbons and R₂ is dialkylamino, piperidino or morpholino. The reaction is carried out at low temperatures (ice bath) in the presence of ether. A water soluble product is formed which is extracted with a large volume of ether. Substantially all of the ether must then be removed, as by filtration thru a fine sintered glass funnel, with the aid of a high vacuum pump. Thereafter a basic salicylamide is obtained either in the form of an oil or as a crystallized product. The acetyl group may be removed by hydrolysis using an alkali to give the phenolic basic amide.

The following examples are presented in order to disclose the invention more fully. It should be understood however that the examples are not intended in any way to be a limitation of the invention.

EXAMPLE I

*N-β-morpholinoethylacetylsalicylamide*

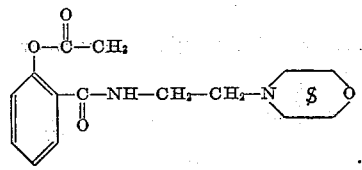

To a stirred solution of 19.8 g. (.1 mole) of acetylsalicylyl chloride in 300 cc. of ether, which is cooled in an ice bath, there is added dropwise a solution of 13.0 g. (.1 mole) of N-morpholinoethylamine in 100 cc. of ether. After the addition is completed, the mixture is allowed to come to room temperature and is stirred for six hours. The hydrochloride is filtered off and dried in a vacuum dessicator, to give 26 g. of a very hygroscopic material. This is recrystallized from ethanol-ether to give 22.5 g. of the above named product, M. P. 147–150° C.; a yield of 69%. Further recrystallization raised the melting point to 150–152° C. *Analysis.*—Calc. for C₁₅H₂₀N₂O₄·HCl: C, 54.79; H, 6.44; N, 8.52. Found: C, 54.81; H, 6.33; N, 8.40.

EXAMPLE II

*N-(2-dimethylamino-2-methylpropyl)-acetylsalicylamide*

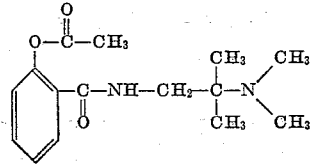

To a stirred solution of 19.8 g. (.1 mole) of acetylsalicylyl chloride in 300 cc. of ether, which is cooled in an ice bath, there is added dropwise a solution of 11.6 g. (.1 mole) of 2-dimethylamino-2-methylpropylamine in 100 cc. of ether. After the addition is completed, the mixture is allowed to come to room temperature and is stirred for six hours. The hydrochloride (22 g.) is filtered off but is too hygroscopic to work with. It is dissolved in water, cooled and neutralized with 10% sodium hydroxide solution. The basic solution is continuously extracted with ether for twenty-four hours and the ether portion dried over anhydrous magnesium sulfate. The ether mixture is then filtered and the solvent removed in vacuo, to leave a viscous oil residue. The oil is filtered through a fine sintered glass funnel with the aid of a high vacuum pump to remove the last traces of solvents. Upon standing the above named material crystallizes. There is obtained 10.7 g. M. P. 95–100° C. Recrystallization from ether raises the melting point to 101–103° C.; yield 39%. *Analysis.*—Calc. for C₁₅H₂₂N₂O₃: C, 64.72; H, 8.15. Found: C, 64.96; H, 8.36.

EXAMPLE III

*N-β-morpholinoethylsalicylamide*

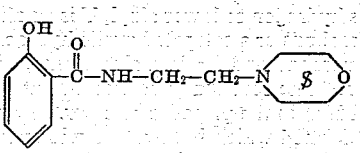

A 6.6 g. sample of N-β-morpholinoethylacetylsalicylamide hydrochloride is dissolved in water and made alkaline with 20% sodium hydroxide solution. The basic solution is heated on a steam bath for two hours and allowed to stand overnight at room temperature. After continuously extracting with ether for sixteen hours, the ether portion is dried, filtered and concentrated to a small volume. Upon the addition of Skelly "B" there is obtained 3.5 g. of the above named product, M. P. 96–97° C. This corresponds to a yield of 70%. *Analysis.*—Calc. for $C_{13}H_{18}N_2O_3$: C, 62.38; H, 7.25; N, 11.20. Found: C, 62.62; H, 7.11; N, 11.20.

EXAMPLE IV

*N-(1-dimethylaminopropyl-2)-acetylsalicylamide*

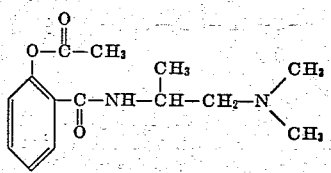

By the procedure of Example II using 10.2 g. (.1 mole) of 1-methyl-2-dimethylaminoethylamine, there is obtained N-(1-dimethylaminopropyl-2)-acetylsalicylamide as a very viscous yellow oil. *Analysis.*—Calc. for $C_{14}H_{20}N_2O_3$: C, 63.61; H, 7.63. Found: C, 63.47; H, 8.12.

EXAMPLE V

*N-methyl-N-β-dimethylaminoethylacetylsalicylamide*

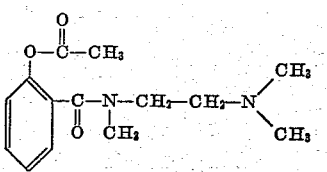

By the procedure of Example II using 10.2 g. (.1 mole) of N-methyl-β-dimethylaminoethylamine, there is obtained N-methyl - N - β - dimethylaminoethylacetylsalicylamide as a light yellow viscous oil. *Analysis.*—Calc. for $C_{14}H_{20}N_2O_3$: C, 63.61; H, 7.63. Found: C, 63.75; H, 7.51.

EXAMPLE VI

*1,2-dimethyl-4-acetylsalicyloylpiperazine*

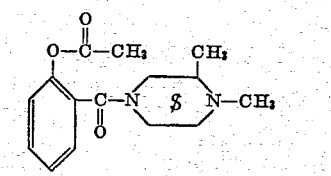

By the procedure of Example II using 11.4 g. (.1 mole) of 1,2-dimethylpiperazine, there is obtained 1,2-dimethyl-4-acetylsalicyloylpiperazine as a light yellow viscous oil. *Analysis.*—Calc. for $C_{15}H_{20}N_2O_3$: C, 65.19; H, 7.30. Found: C, 65.39; H, 7.56.

EXAMPLE VII

*1-acetylsalicyloyl-2-β-piperidinoethylpiperidine*

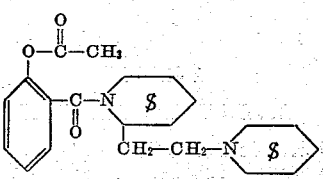

By the procedure of Example II using 20 g. (.1 mole) of 2-(β-N-piperidylethyl)-piperidine, there is obtained 1-acetylsalicyloyl-2-β-piperidinoethylpiperidine as a light yellow viscous oil. *Analysis.*—Calc. for $C_{21}H_{30}NO_3$: C, 70.36; H, 8.44; N, 7.82. Found: C, 70.19; H, 8.64; N, 7.95.

EXAMPLE VIII

*N-β-dimethylaminoethylacetylsalicylamide*

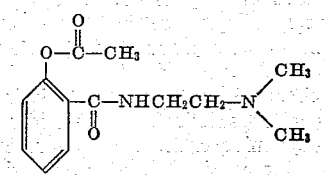

By the procedure of Example II using 9 g. (.1 mole) of dimethylaminoethylamine, there is obtained N-β-dimethylaminoethylacetylsalicylamide as a straw colored oil. *Analysis.*—Calc. for $C_{13}H_{18}N_2O_3$: N, 11.20 Found: N, 11.45.

EXAMPLE IX

*1-methyl-4-acetylsalicyloylpiperazine*

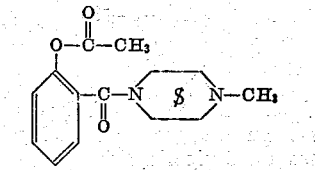

By the procedure of Example II using 10 g. (.1 mole) of N-methylpiperazine, there is obtained 1-methyl-4-acetylsalicyloylpiperazine, M. P. 133–135° C. *Analysis.*—Calc. for $C_{14}H_{18}N_2O_3$: N, 13.08. Found: N, 12.95.

EXAMPLE X

*N-(1-diethylamino-4-cyclohexyl)-acetylsalicylamide*

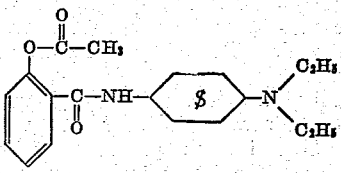

By the procedure of Example II using 17 g. (.1 mole) of N,N-diethyl-1,4-cyclohexanediamine, there is obtained N - (1 - diethylamino - 4 - cyclohexyl) - acetylsalicylamide, M. P. 98–99° C. *Analysis.*—Calc. for $C_{19}H_{28}N_2O_3$: C, 68.64; H, 8.49; N, 8.43. Found: C, 68.84; H, 8.37; N, 8.66.

EXAMPLE XI

*1-carbethoxy-4-acetylsalicyloylpiperazine*

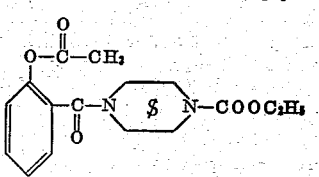

By the procedure of Example II using 18.6 g. (.1 mole) of N-carbethoxy-2,6-dimethylpiperazine, there is obtained 1-carbethoxy-4-acetylsalicyloylpiperazine as a colorless viscous oil. *Analysis.*—Calc. for $C_{16}H_{20}N_2O_5$: C, 62.05; H, 6.94; N, 8.04. Found: C, 61.96; H, 7.07; N, 7.89.

EXAMPLE XII

*N-methyl-N-β-piperidinoethylacetylsalicylamide*

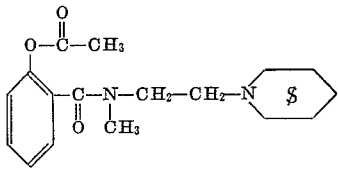

By the procedure of Example II using 14.4 g. (.1 mole) of N-methyl-β-piperidinoethylamine, there is obtained N-methyl-N-β-piperidinoethylacetylsalicylamide as a viscous oil. *Analysis.*—Calc. for $C_{17}H_{24}N_2O_3$: C, 67.08; H, 7.95; N, 9.21. Found: C, 66.50; H, 7.85; N, 8.84.

EXAMPLE XIII

*N-δ-morpholinopropylsalicylamide*

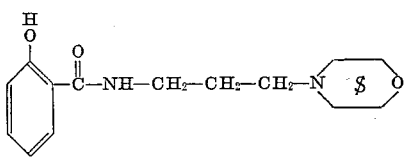

By the procedure of Example II followed by the procedure of Example III, using 14.4 g. (.1 mole) of δ-morpholinopropylamine, there is obtained N-δ-morpholinopropylsalicylamide as colorless plates, M. P. 80–81° C. *Analysis.*—Calc. for $C_{14}H_{20}N_2O_3$: C, 63.61; H, 7.62; N, 10.60. Found: C, 63.79; H, 7.47; N, 10.70.

EXAMPLE XIV

*N-ε-morpholinopentylsalicylamide*

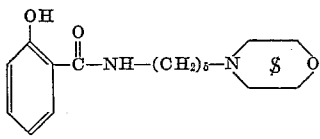

By the procedure of Example II followed by the procedure of Example III, using 17.2 g. (.1 mole) of ε-morpholinopentylamine, there is obtained N-ε-morpholinopentylsalicylamide monohydrate M. P. 85–87° C. *Analysis.*—Calc. for $C_{16}H_{34}N_2O_3 \cdot H_2O$: C, 61.91; H, 8.44; N, 9.03. Found: C, 61.73; H, 8.43; N, 9.11.

Others may practice the invention in any of the numerous ways which will be suggested to one skilled in the art. Such practice is considered to be covered by the invention provided it falls within the scope of the appended claims.

We claim:
1. A new chemical compound selected from the group consisting of bases having the formula

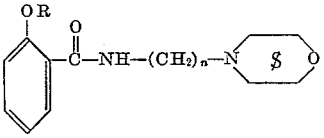

where R is selected from the group consisting of hydrogen and acetyl and $n$ is 2–5 inclusive, and the acid addition salts thereof.

2. A base having the formula

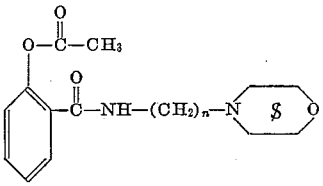

where $n$ is 2–5.

3. The bases according to claim 1.
4. The acid addition salts according to claim 1.
5. A base having the formula

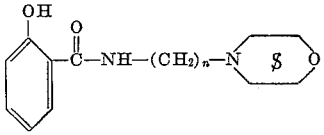

where $n$ is 2–5 inclusive.

6. N-ε-morpholinopentylsalicylamide.
7. N-γ-morpholinopropylsalicylamide.
8. N-β-morpholinoethylacetylsalicylamide hydrochloride.
9. N-β-morpholinoethylsalicylamide.

References Cited in the file of this patent

UNITED STATES PATENTS

| | | |
|---|---|---|
| 2,338,178 | Graenacher et al. | Jan. 4, 1944 |
| 2,419,932 | Grimmel et al. | Apr. 29, 1947 |
| 2,464,094 | Meade | Mar. 8, 1949 |
| 2,688,026 | Krimmel | Aug. 31, 1954 |
| 2,690,041 | Clinton | Oct. 5, 1954 |
| 2,691,025 | Clinton | Oct. 5, 1954 |

OTHER REFERENCES

Conant et al.: Chemistry of Organic Compounds, pages 97–98, 1947.

Bing et al.: Acta Phar., vol. 4, pp. 199–204 (1948).